(12) United States Patent
Fecht

(10) Patent No.: US 7,131,232 B1
(45) Date of Patent: Nov. 7, 2006

(54) FISHING ROD HOLDER AND CLAMP APPARATUS

(76) Inventor: Bradley J. Fecht, 609 Mission NE., Albuquerque, NM (US) 87107

( * ) Notice: Subject to any disclaimer, the term of this patent is extended or adjusted under 35 U.S.C. 154(b) by 219 days.

(21) Appl. No.: 10/849,965

(22) Filed: May 20, 2004

(51) Int. Cl.
*A01K 97/10* (2006.01)

(52) U.S. Cl. .................. 43/21.2; 248/523; 248/525

(58) Field of Classification Search ............. 43/21.2; 248/523, 524, 525, 526
See application file for complete search history.

(56) References Cited

U.S. PATENT DOCUMENTS

| | | | |
|---|---|---|---|
| 1,459,438 A * | 6/1923 | Mathias .................. 248/514 |
| 2,211,278 A * | 8/1940 | Aime ....................... 43/21.2 |
| 2,507,650 A | 5/1950 | Seiple | |
| 2,704,412 A * | 3/1955 | Davis ....................... 43/21.2 |
| 3,037,314 A | 6/1962 | Hardy | |
| 3,570,793 A * | 3/1971 | Shackel .................. 248/515 |
| 4,017,998 A | 4/1977 | Dumler | |
| 4,257,181 A * | 3/1981 | Cooper .................... 43/21.2 |
| 4,528,768 A | 7/1985 | Anderson | |
| 4,637,156 A * | 1/1987 | Simmons ................. 43/21.2 |
| 4,641,453 A * | 2/1987 | Roberts, Sr. ............. 43/17 |
| 4,807,384 A * | 2/1989 | Roberts, Sr. ............. 43/17 |
| 4,916,847 A * | 4/1990 | Rusgo ...................... 43/19.2 |
| 5,142,809 A * | 9/1992 | O'Brien et al. .......... 43/21.2 |
| 5,231,785 A * | 8/1993 | Roberts .................... 43/21.2 |
| 5,359,802 A * | 11/1994 | Gutierrez ................ 43/16 |
| 5,446,989 A * | 9/1995 | Stange et al. ........... 43/21.2 |
| 5,460,306 A * | 10/1995 | Rudd ........................ 224/557 |
| D390,627 S | 2/1998 | Waldman | |
| 6,089,524 A * | 7/2000 | Lai ............................ 248/535 |
| 6,318,018 B1 | 11/2001 | Weaver | |
| 6,533,237 B1 | 3/2003 | Matusek | |
| 6,571,507 B1 * | 6/2003 | Elford ...................... 43/21.2 |
| 6,646,557 B1 * | 11/2003 | Brake ....................... 340/573.2 |
| 2003/0070698 A1 | 4/2003 | Wells | |

* cited by examiner

*Primary Examiner*—Peter M. Poon
*Assistant Examiner*—David J. Parsley
(74) *Attorney, Agent, or Firm*—Robert W. Harris

(57) ABSTRACT

Apparatus for temporarily securing a fishing rod in position while fishing, during the interval between fish strikes, having a fixed hollow tubular holder for the rod handle inserted in one end of the holder, the holder having an opening on the top, and having a clamp hingedly attached to one end of the opening, the clamp and opening being of a form allowing the user to secure the rod handle within the holder, by pressing down upon the clamp; and to free the rod handle from the holder by simply pulling up on the clamp.

5 Claims, 3 Drawing Sheets

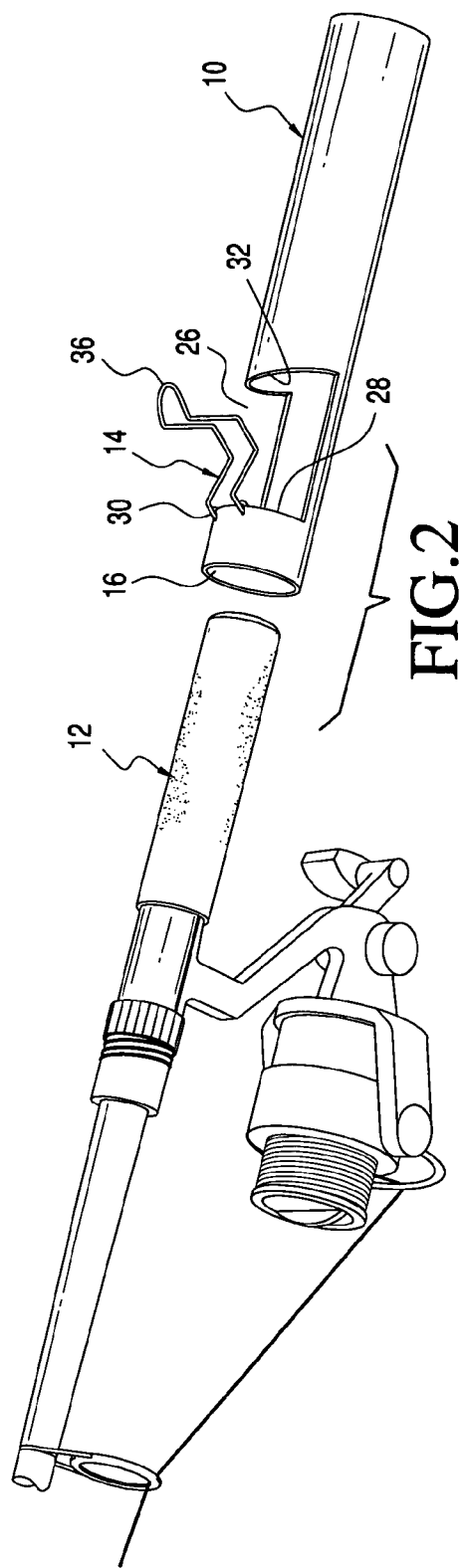
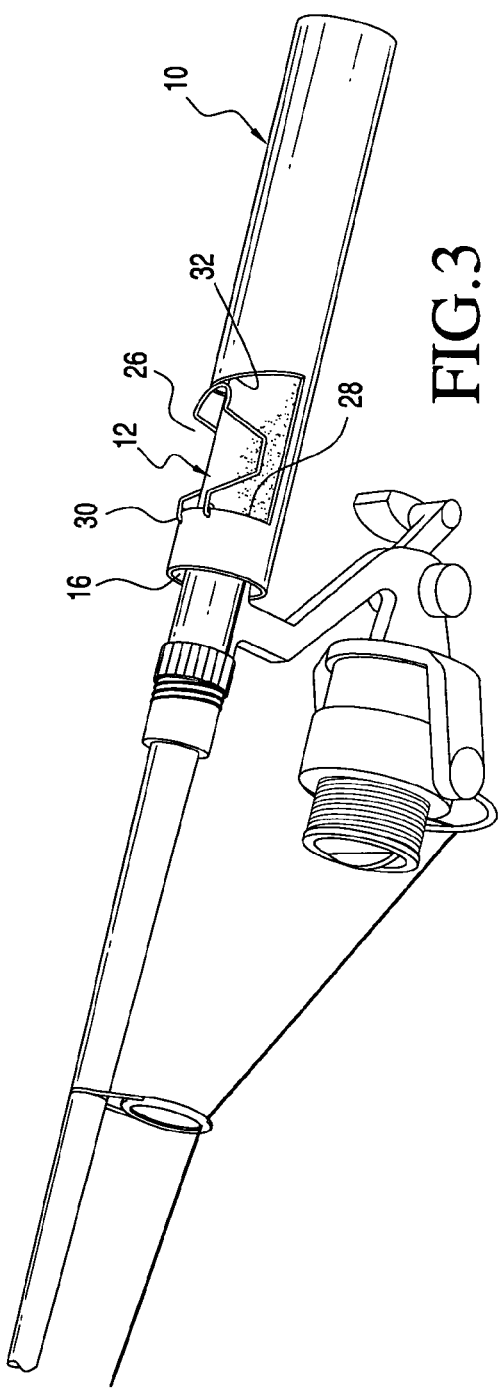

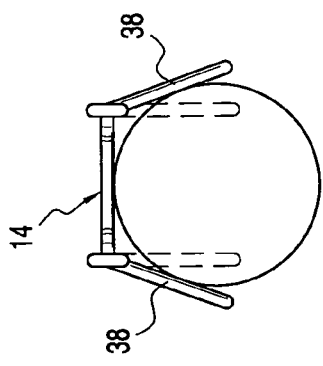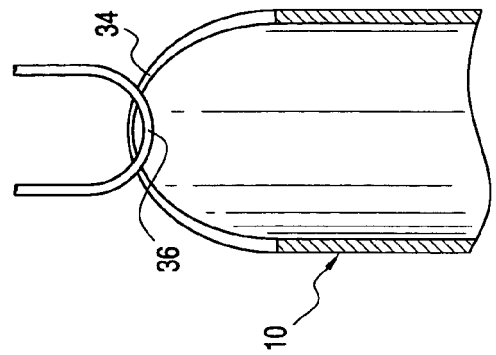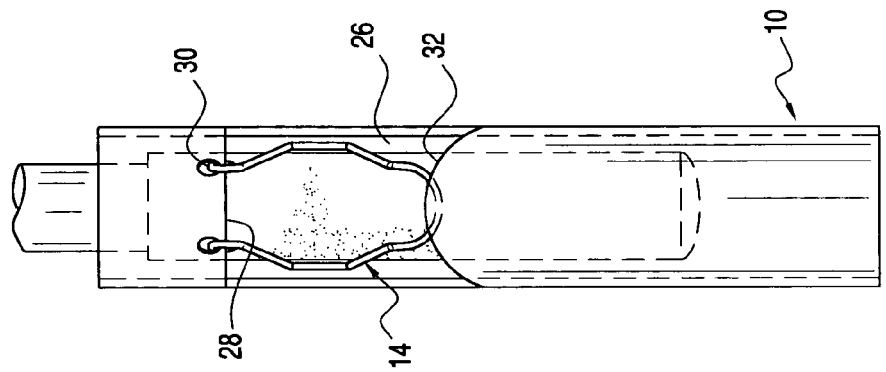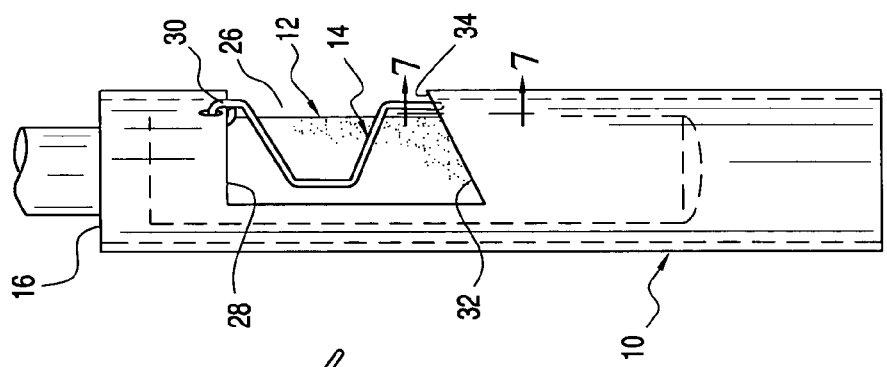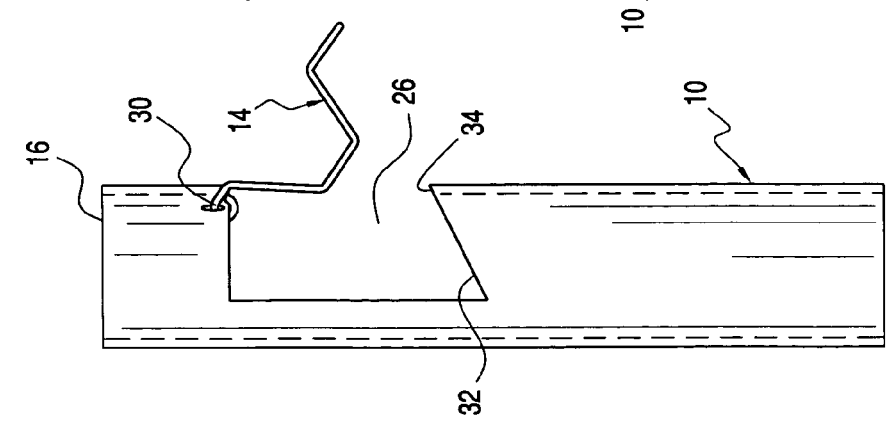

US 7,131,232 B1

FISHING ROD HOLDER AND CLAMP APPARATUS

BACKGROUND OF THE INVENTION

The present invention pertains to apparatus for temporarily securing a fishing rod in place during fishing, so that the person fishing need not constantly hold the rod while waiting for a fish strike, and more particularly to a combined rod holder and clamp allowing the user to both readily and quickly secure the rod and retrieve it when a strike occurs.

Everyone who fishes is well aware that even on a productive fishing outing, there are often long intervals between fish strikes. Yet it is necessary that the fishing rod handle be held constantly in a secure position, lest the rod be pulled into the water and lost when a strike occurs.

To obviate any need for the user to constantly hold the rod in the hand, it is desirable to provide an apparatus allowing the user to temporarily secure the fishing rod handle, so that the user may engage in other activities between fish strikes, such as reading, consuming food and/or a beverage, or quietly talking to any fishing companions.

It is needed that such an apparatus allow the user to easily and quickly secure the rod handle to the apparatus to await a fish strike, and even more importantly, to very easily and quickly remove the rod handle from the apparatus when a strike occurs. It is also needed to provide such an apparatus which is simple in form, and uses a minimum of material, so as to be easily and inexpensively manufactured.

Embodiments of the present invention, detailed below, meet said needs by the general approach of providing a fixed hollow tubular holder for the rod handle inserted in one end of the holder, said holder having an opening on the top, and a clamp hingedly attached to one end of said opening, said clamp and opening being of a form allowing the user to secure the rod handle within the holder in two ways, by pressing down upon the clamp, which causes the clamp to engage a lip at one end of said opening, and also causes the clamp to engage the rod handle by clamping said handle between the sides of the clamp; and to free the rod handle from the holder by simply pulling up on the clamp.

It is not the intent of this application, by stating that certain embodiments of the present invention are suited to meeting certain needs, to necessarily limit the scope of the invention to only embodiments which meet said needs; it is instead the intent that the scope of the invention be determined by the claims as more fully stated below.

SUMMARY OF THE INVENTION

As a summary, this section of course does not explicate the invention in all the detail of the subsequent detailed description and claims. It is intended that the relative brevity of this summary shall not limit the scope of the invention, which scope is to be determined by the claims, properly construed, including all subject matter encompassed by the doctrine of equivalents as properly applied to the claims.

In one broad aspect the invention is an apparatus for temporarily securing a handle of a fishing rod in a fixed position while using said rod in fishing, for maintaining said fixed position during the interval between fish strikes and upon occurrence of a fish strike, and for allowing a user of said apparatus and rod to readily release and manually grasp said handle immediately upon occurrence of said strike, comprising: a fixed hollow tubular holder for said handle of said fishing rod, said tubular holder having a top and having a principal longitudinal axis and having an opening in one end of said tubular holder and having an inner diameter sufficient in size to allow said handle to be readily inserted in one end of said holder, said holder having an opening on a portion of said top of said holder; a clamping means attached to said tubular holder and disposed principally above said opening, for allowing said user to secure said rod handle within said holder, by pressing down upon said clamping means; and for allowing said user to free said rod handle from said holder by pulling up on said clamping means; and minimalist means for allowing use of both a minimum amount of material and simplicity of design.

In another broad aspect the invention is an apparatus for temporarily securing a handle of a fishing rod in a fixed position while using said rod in fishing, for maintaining said fixed position during the interval between fish strikes and upon occurrence of a fish strike, and for allowing a user of said apparatus and rod to readily release and manually grasp said handle immediately upon occurrence of said strike, comprising: a fixed hollow tubular holder for said handle of said fishing rod, said tubular holder having a top and having a principal longitudinal axis and having an opening in one end of said tubular holder and having an inner diameter sufficient in size to allow said handle to be readily inserted in one end of said holder, said holder having an opening on a portion of said top of said holder; a clamp, formed of a single piece of metal, said clamp being hingedlyly attached to said top of said tubular holder at a location least substantially at a first edge of said opening, and disposed principally above said opening, said clamp having a length such that when said user pushes said clamp down against said top of said holder an end of said clamp passes just under a lip in a second edge of said opening; said clamp having a bottom portion having an opening width slightly less than the diameter of said handle and having a height such that when said user pushes said clamp down against said top of said holder said sides of said clamp are pushed apart slightly by said handle, and upon being pushed down further by said user said sides of said clamp compressively engage said handle.

BRIEF DESCRIPTION OF THE DRAWINGS

FIG. 2 is a perspective view of the invention with the rod and reel handle just removed from the rod handle holder, and with the clamp raised in the unlocked position.

FIG. 3 is a perspective view as in FIG. 2, but with the handle of the rod and reel inserted into the holder and the clamp pushed down into the locked position.

FIG. 4 is a side elevational view of the holder, with the handle removed, and the clamp in the unlocked position.

FIG. 5 is a side elevational view as in FIG. 4, but with the handle inserted into the holder and the clamp in the locked position.

FIG. 6 is a plan view as in FIG. 5, of the handle secured within the holder and the clamp in the locked position.

FIG. 7 is a sectional view, in the direction indicated by section line 7—7 in FIG. 5, of a portion of the device showing an end of the clamp fitting under a lip in the opening in the top of the holder, in the locked configuration.

FIG. 8 is an end elevational view, looking along the cylindrical axis of the rod and reel handle, of only the handle and the clamp, also showing in phantom the clamp configuration in the absence of the handle, showing that the clamp compressively holds the handle, in the locked clamp configuration.

DETAILED DESCRIPTION

Figure 1B:
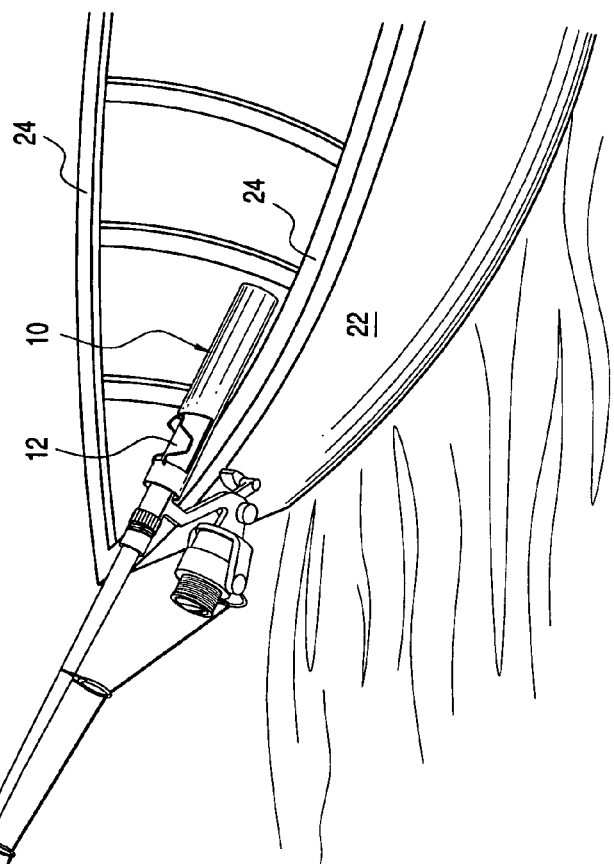
FIG. 1B is a perspective view of the invention in place holding the handle of a rod and reel, and with the rod handle holder tube secured to the gunwale of a fishing boat.
Figure 1A:
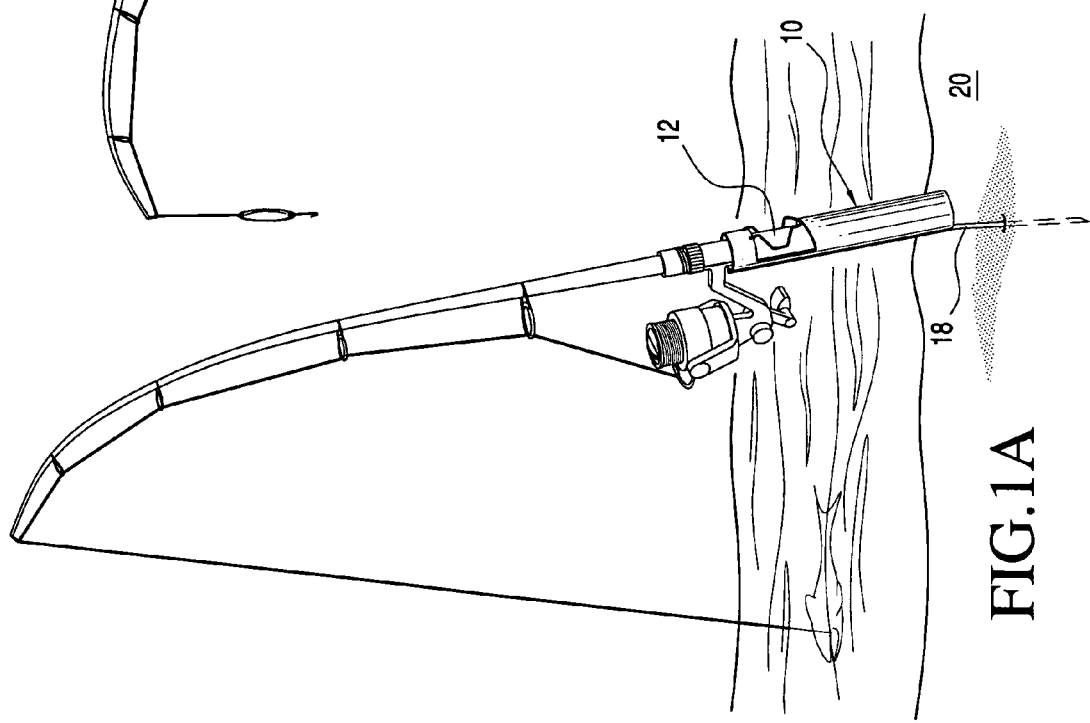
FIG. 1A is a perspective view of the invention in place holding the handle of a rod and reel, and with the rod handle holder tube secured by a stake in the ground on a river bank.

Those familiar with the art will understand that the invention may be employed in varied embodiments, for various specific purposes, without departing from the essential substance thereof. The description of any one embodiment given below is intended to illustrate an example rather than to limit the invention. This section is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

Referring now to the drawings, in which like reference numbers denote like or corresponding elements, the principal components of the apparatus are a holder 10, for holding the fishing rod handle 12, and a clamp 14, hingedly attached to holder 10. The holder 10 is an open cylindrical cylinder having a longitudinal axis (not shown), open at end 16, and having an inner diameter just sufficient to be able to receive the fishing rod handle 12.

The holder 10 is fixed in position with respect to the fishing site, by any convenient means. For example, if the fishing site is the earthen bank of a body of water, the holder 10 may be secured by bolts or screws (not shown) at one end of metal stake 18 having a pointed opposite end, and stake 18 may be driven into the ground 20, so that holder 10 will be maintained in a fixed position. If the fishing site is a boat 22, the holder 10 may be securely screwed, bolted, or welded onto the boat gunwale 24. The precise means of securing the holder 10 in a fixed position with respect to the fishing site is a matter of choice among alternative means well known in the art, and references in the claims to the holder being "fixed" are not intended to limit the invention to the choice of any one such means, or to choice of any particular kind of fishing site. The holder 10 is not moved with respect to the fishing site during use of the invention on a given fishing outing; the user only moves the handle 12 with respect to holder 10, inserting and securing handle 12 within holder 10, and later removing handle 12 from holder 10 on the occasion of a fish strike and at the end of the fishing outing, in the manner detailed below.

Along a portion of the, top of holder 10 is an opening 26, having a principal axis at least substantially parallel to the longitudinal axis of holder 10. The opening 26 is formed by cutting away a portion of the upper half of holder 10, which portion is at least substantially the entire upper half of holder 10 along a length of holder 10 which determines the length of opening 26. The opening 26 does not extend to either end of holder 10. The clamp 14 is secured to holder 10 at or immediately adjacent to one end 28 of opening 26 by a hinge 30. At the opposite end 32 of opening 26 there is a lip 34 slanting to slightly greater length of opening 26 as one moves downward. The length of clamp 14 slightly exceeds the length of opening 26, just sufficiently so that when clamp 14 is pushed downward by the user, the user may, by slight upward flexing of clamp 14 with the fingers, cause the end 36 of clamp 14 opposite hinge 30 to just slip under lip 34, to the configuration best seen in FIG. 7, so that the engagement of end 36 by lip 34 provides one means of securing clamp 14 in a locked position, against the top of holder 10. When the user desires to unlock clamp 14, the user may, by simply pulling up on and slightly flexing clamp 14 near end 36 of clamp 14, cause end 36 to ride upward along lip 34 until end 36 comes free of lip 34 and end 32 of opening 26, allowing clamp 14 to be freely rotated upward about hinge 30.

The clamp 14, which may be formed of a single piece of metal, which need not be more than about ¼ inch thick, is of a simple open rectangular form as seen in plan view. As seen in end view, clamp 14 has lower side portions 38 which extend downward with an opening space between them slightly smaller than the diameter of the fishing rod handle 12, and extending downward sufficiently, when clamp 14 is pressed down into the locked position against the top of holder 10, to enter within the interior of holder 10 through opening 26, and engage handle 12. Thus when the user presses clamp 14 down into the locked configuration, the user, by pushing lower side portions 38 downward against the sides of handle 12, causes handle 12 to force lower side portions 38 further apart, than their normal configuration, so that lower side portions 38 of clamp 14 act to compressively engage handle 12, in the locked configuration. This compressive engagement is best illustrated in FIG. 8. By simply pulling up on clamp 14 near end 36, the user may raise the lower side portions 38 of clamp 14 sufficiently to unlock this compressive engagement of handle 12 by lower side portions 38.

The simple form of the apparatus provides minimalist means, for both allowing use of a minimum amount of material and simplicity of design, through the combination of the simple cylindrical holder 10 with its simple opening 26, and the simple hingedly attached clamp 14, which clamp may be formed of a single piece of metal, of rectangular form in plan view and having its lower side portions 38 for gripping the fishing rod handle 12 in the locked configuration.

Those familiar with the art will understand that various modifications of the above-described embodiment may be made, without departing from the substance of the invention. For example, the hinge 30 for attaching clamp 14 to holder 10, might be located at either end of opening 26.

Although the clamp 14 is formed of one piece of steel, such as stainless steel or spring steel, other metals or even plastic of suitable strength might me used instead. The holder 10 may be made of metal or plastic of suitable strength and durability; no particular material is required for holder 10.

Although the hinge 30 may be formed simply by looping ends of clamp 14 through holes in holder 10 near end 28 of opening 26, as indicated in FIGS. 4–6, other forms of hinge could of course be employed instead; no particular form of hinge is required, provided that hinge 30 allows reasonably free rotation of clamp 14 about hinge 30 as an axis.

Although the invention is primarily intended for use during fishing outings as indicated above, it may of course also be used to simply secure the rod and reel between fishing outings.

I claim:

1. Apparatus for temporarily securing a handle of a fishing rod in a fixed position while using said rod in fishing, for maintaining said fixed position during the interval between fish strikes and upon occurrence of a fish strike, and for allowing a user of said apparatus and rod to readily release said handle immediately upon occurrence of said strike, comprising:

a fixed hollow tubular holder for said handle of said fishing rod, said tubular holder having a top and having a principal longitudinal axis and having a first opening in one end of said tubular holder and having an inner diameter sufficient in size to allow said handle to be readily inserted in one end of said holder, said holder having a second opening on a portion of said top of said holder;

a clamp, formed of a single piece of metal, said clamp being hingedly attached to said top of said tubular holder at a location at least substantially at a first edge of said second opening, and disposed principally above said second opening, said clamp having a length such that when said user pushes said clamp down against said top of said holder an end of said clamp passes just under a lip in a second edge of said second opening; said clamp having a bottom portion with sides forming a third opening with a width slightly less than the diameter of said handle and having a height such that when said user pushes said clamp down against said top of said holder said sides of said clamp are pushed apart slightly by said handle, and upon being pushed down further by said user said sides of said clamp compressively engage said handle.

2. Apparatus of claim 1, wherein said opening has a principal longitudinal axis at least substantially parallel to said longitudinal axis of said tubular holder, and wherein said first edge and said second edge of said opening are located at opposite ends of said longitudinal axis of said opening.

3. Apparatus of claim 1, wherein said clamp is steel having a thickness at least substantially equal to ¼ inch.

4. Apparatus for temporarily securing a handle of a fishing rod in a fixed position with respect to a fishing site while using said rod in fishing, for maintaining said fixed position during the interval between fish strikes and upon occurrence of a fish strike, and for allowing a user of said apparatus and rod to readily release and manually grasp said handle immediately upon occurrence of said strike, comprising:

a hollow tubular holder for said handle of said fishing rod, said tubular holder having a top and having a principal longitudinal axis and having a first opening in one end of said tubular holder and having an inner diameter just sufficient in size to allow said handle to be readily inserted in one end of said holder, said holder having a second opening on a portion of said top of said holder;

a holder securing means, connected to said holder, for securing said holder in a fixed position with respect to said fishing site;

a clamp, formed of a single piece of metal, said clamp being hingedly attached to said top of said tubular holder at a location least substantially at a first edge of said opening, and disposed principally above said opening, said clamp having a length such that when said user pushes said clamp down against said top of said holder an end of said clamp passes just under a lip in a second edge of said opening; said clamp having a bottom portion with sides forming a third opening with a width slightly less than the diameter of said handle and having a height such that when said user pushes said clamp down against said top of said holder said sides of said clamp are pushed apart slightly by said handle, and upon being pushed down further by said user said sides of said clamp compressively engage said handle.

5. Apparatus of claim 4, wherein said fishing site is a boat having a gunwale and said holder securing means is a means for securing said holder to said gunwale of said boat.

\* \* \* \* \*